United States Patent [19]

Sato et al.

[11] Patent Number: 5,534,940
[45] Date of Patent: Jul. 9, 1996

[54] APPARATUS AND METHOD FOR DRIVING A LIQUID CRYSTAL DISPLAY UTILIZING VARIOUS TELEVISION SYSTEM FORMATS

[75] Inventors: Masayori Sato, Saitama-ken; Kouichi Tago, Kanagawa-ken, both of Japan

[73] Assignee: Kabushiki Kaisha Japan, Japan

[21] Appl. No.: 164,442

[22] Filed: Dec. 9, 1993

[30] Foreign Application Priority Data

Dec. 16, 1992 [JP] Japan ................................. 4-336101

[51] Int. Cl.⁶ ........................... H04N 3/14; H04N 5/40
[52] U.S. Cl. ...................... 348/556; 348/792; 348/558
[58] Field of Search .................................... 348/558, 556, 348/555, 790, 441, 445, 792; H04N 5/46, 3/14

[56] References Cited

U.S. PATENT DOCUMENTS

| | | | |
|---|---|---|---|
| 4,953,025 | 8/1990 | Saitoh et al. | 348/445 |
| 5,091,784 | 2/1992 | Someya et al. | 348/792 |
| 5,227,882 | 7/1993 | Kato | 348/792 |
| 5,301,031 | 4/1994 | Eto et al. | 348/792 |

*Primary Examiner*—Victor R. Kostak
*Attorney, Agent, or Firm*—Banner & Allegretti, Ltd.

[57] ABSTRACT

An apparatus for driving a liquid crystal display can receive and adjust to image signals from one of a plurality of image signal formats such as those of the HDTV and NTSC systems, and includes plural shift registers, a sampling and holding (S/L) circuit and a Y driver. When receiving an image signal in the HDTV system, the shift registers receive and shift that image signal in series, and supply each bit data shifted thereby in a horizontal period to the S/L circuit. When receiving an image signal in the NTSC system, the shift registers are functionally divided into one for shifting that image signal and the other for shifting another image signal provided for displaying some pattern, and each bit data of these image signals is supplied to the S/L circuit. The S/L circuit provides the received data for driving data electrodes of the display, while the Y driver drives scanning electrodes of the display. Liquid crystal elements of the display are energized by a cooperated interaction of the data electrodes and scanning electrodes.

16 Claims, 4 Drawing Sheets

APPARATUS AND METHOD FOR DRIVING A LIQUID CRYSTAL DISPLAY UTILIZING VARIOUS TELEVISION SYSTEM FORMATS

FIELD OF THE INVENTION

The present invention generally relates to the television field, and more particularly, is directed to a television receiver which employs a liquid crystal display device for displaying an image of the received image signal. The television receiver is capable of receiving a plurality of image signals with different formats, and selectively displaying one of the images of the different aspect ratios on the same screen.

BACKGROUND OF THE INVENTION

Recently, there have been test broadcasts of a high definition television (HDTV) signal format which is capable of producing high quality television images. In view of the popularity of existing NTSC television systems and the large installed base of such equipment, television receivers which are capable of receiving image signals in both the NTSC and HDTV system formats are being made commercially available. Such television receivers employ one of two types of cathode ray tube (CRT) in which the aspect ratio of the screen surface is either 16:9 (representative of the HDTV format) or 4:3 (representative of the NTSC format). These television receivers contain a convertor for converting from one type of format to the other.

Figure 1:
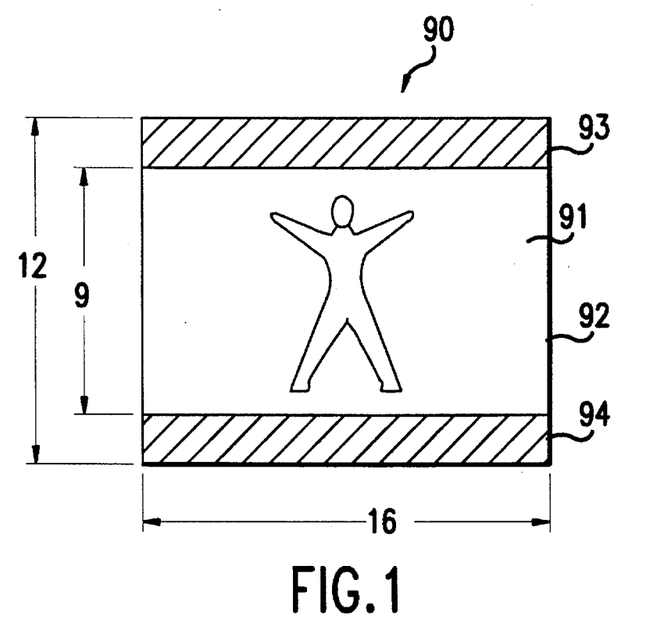
FIG. 1 is an illustration of a display screen showing an image with the aspect ratio of 16:9 on a CRT screen with the aspect ratio of 4:3.

In the case where a television receiver has the screen with the aspect ratio of 4:3 for the NTSC format, an HDTV to NTSC system convertor (which enables reception of HDTV broadcasts on a standard NTSC television receiver) is used for displaying HDTV images on the screen of such television receiver. Such a display screen is illustrated in FIG. 1. As shown in FIG. 1, the image 91 in the HDTV system is displayed in the center section 92 occupying ¾ (i.e., 9/12) of the height of screen 90. At the same time, the top and bottom sections 93 and 94 in screen 90 are rendered non-graphic or unusable for the display of picture information, so that these sections 93 and 94 are tinged black.

Figure 2:
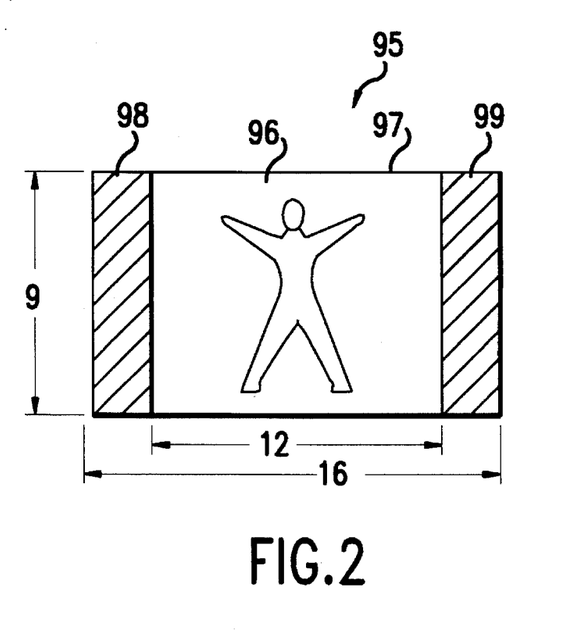
FIG. 2 is an illustration of a display screen on showing an image with the aspect ratio of 4:3 on a CRT screen with the aspect ratio of 16:9.

However, in the case of a television receiver of the HDTV system having the screen with the aspect ratio of 16:9, insertions of black images into the right and left sections in the screen and an addition of scanning lines are performed for displaying NTSC images with the aspect ratio of 4:3 on such screen. FIG. 2 is an illustration of a display screen in such a situation. The image 96 in the NTSC system is displayed in the center section 97 occupying ¾ (i.e., 12/16) of the length of screen 95. At the same time, the left and right sections 98 and 99 in screen 95 are rendered non-graphic or unusable for the display of picture information, so that these sections 98 and 99 are tinged black.

In addition to television receivers which use a CRT, there are presently known in the art television receivers which use a liquid crystal display device instead of a CRT. Moreover, recently, projection-type television receivers have been developed in order to provide large-screen viewing. Such a projection-type television receiver uses a plurality of liquid crystal panels each capable of modulating a colored light being incident thereon. Each of these panels is supplied with, and driven by, image data for modulating the colored light and for producing an image light to be projected onto a screen.

Therefore, there is a need to render the above two types of television receivers, which use a liquid crystal display device, capable of displaying images in both the HDTV and NTSC system formats. Specifically, what is needed is the development of a driving apparatus and method for the liquid crystal display device to selectively display images with both the aspect ratios of 16:9 and 4:3 without unseemly viewing.

SUMMARY OF THE INVENTION

In accordance with the present invention, an apparatus and method for driving a liquid crystal display (having a given aspect ratio) based on one of at least two image signals (i.e., a first and second signal), each having a television system format producing an image with a different aspect ratio, is provided. The aspect ratio of an image produced from, at least, one of the two image signal differs from that of the liquid crystal display. In the invention, one of the image signals is received by the liquid crystal drive circuit. When the drive circuit receives an image signal producing an aspect ratio different from that of the liquid crystal display, frame image data (i.e., a third signal) is provided for being synthesized with the received image signal. In this case, the drive circuit supplies data comprising the received image signal and frame image data to data electrodes of the liquid crystal display. At the same time, the invention energizes scanning electrodes of the liquid crystal display.

Various embodiments of the present invention will become obvious upon an understanding of the illustrative embodiment described below. Various advantages which are not referred to herein will also occur to those skilled in the art upon employment of the present invention in practice.

DETAILED DESCRIPTION OF THE PREFERRED EMBODIMENTS

Various representative embodiments of the present invention will now be explained with reference to the accompanying drawings.

Figure 3:
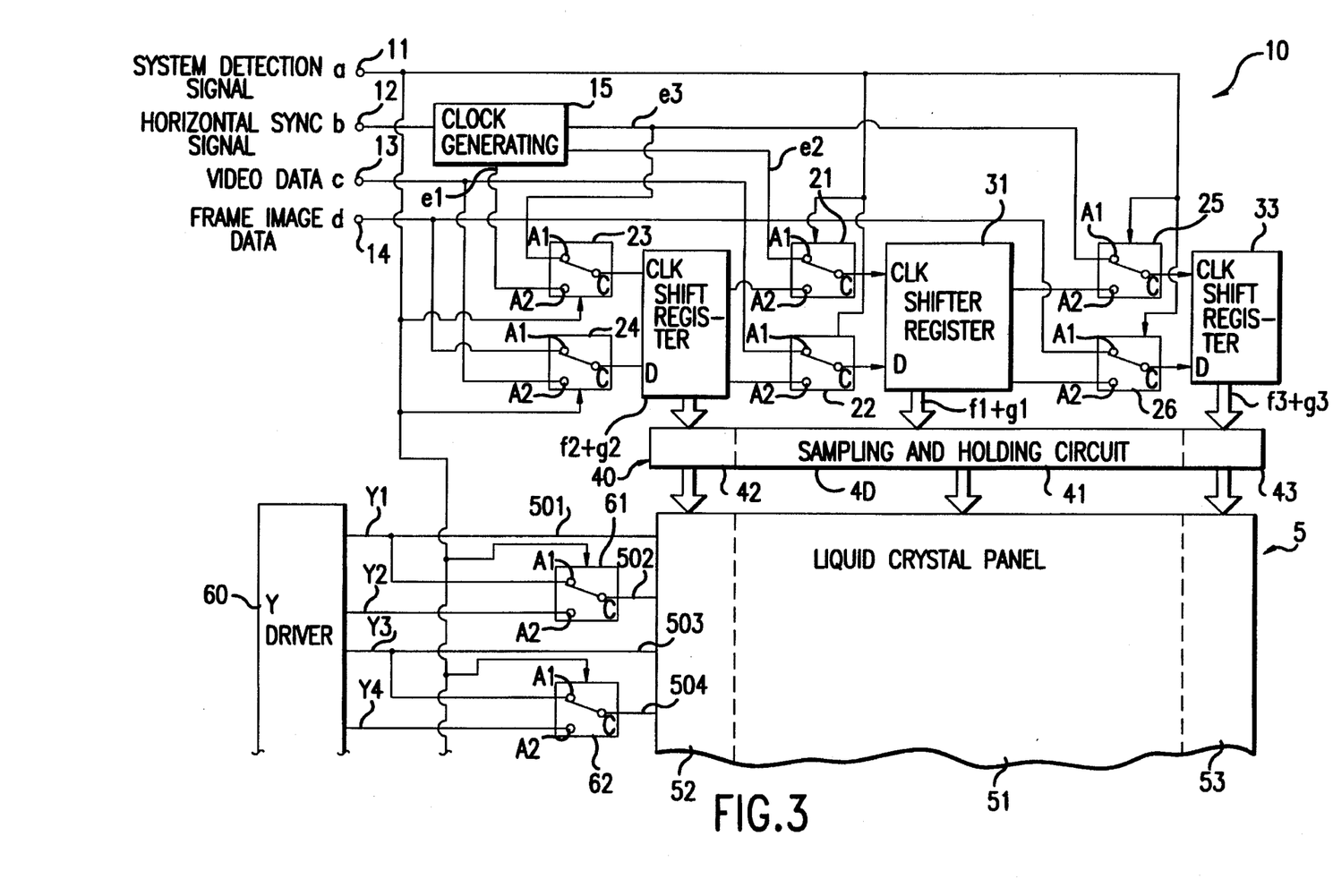
FIG. 3 is a schematic diagram illustrating a circuitry for driving a liquid crystal display device in accordance with an embodiment of the present invention.

FIG. 3 is a block diagram illustrating circuitry for driving a liquid crystal display device to which an embodiment of the present invention can be applied. In this embodiment, liquid crystal module 10 of FIG. 3 is employed for producing an image light in a back-projection-type television receiver. In liquid crystal module 10, there are four input terminals 11 to 14 provided for receiving the following signals. System detection signal (a) is received at terminal 11 to indicate whether an image signal in the HDTV or NTSC television system format is being provided to liquid crystal module 10. When liquid crystal module 10 is provided with an image signal in the HDTV format, the received system detection signal (a) will indicate that the liquid crystal module 10 is to adjust to that format when set equal to a low level, while it is set equal to a high level when receiving an image signal in the NTSC format.

Horizontal synchronizing signal (b) and video data (c) each generated by a video signal processing circuit (not shown) are supplied to input terminals 12 and 13, respectively. The video data (c) comprises one of image signals in either the HDTV or NTSC format, thus corresponding to images with an aspect ratio of either 16:9 or 4:3, respectively. Frame image data (d) generated by the circuitry, which will be discussed below, is supplied to input terminal 14. In this embodiment, the frame image data (d) is provided for displaying an image with the same pattern as the frame of a television receiver, such as the grain of wood.

In liquid crystal module 10, clock generating circuit 15 receives the horizontal synchronizing signal (b) from input terminal 12 and produces three kinds of clock signal based on that signal (b). First clock signal (e1), which has a first number of clock pulses in a horizontal scanning period (various embodiments of the present invention contemplate 960 clock pulses) and is used when displaying images in the HDTV system, is supplied from a first output terminal of clock generating circuit 15 to input terminal A2 of switching circuit 23. Second clock signal (e2), which has a second number of clock pulses in a horizontal scanning period (various embodiments of the present invention contemplate 720 clock pulses) and is used when displaying images in the NTSC system, is supplied from a second output terminal of clock generating circuit 15 to input terminal A1 of switching circuit 21. Third clock signal (e3), which has a third number of clock pulses in the first one-sixth (⅙) of a horizontal scanning period (various embodiments of the present invention contemplate 120 clock pulses) and is used for supplying the frame image data (d) when displaying images in the NTSC system, is supplied from a third output terminal of clock generating circuit 15 to input terminals A1 of both switching circuits 23 and 25.

At the same time, the video data (c) is supplied from input terminal 13 to input terminals A1 and A2 of switching circuits 22 and 24, respectively. In addition, the frame image data (d) is supplied from input terminal 14 to both input terminals A1 of switching circuits 24 and 26.

Each of switching circuits 23 and 24 is controlled by the system detection signal (a) so that input terminal A1 of switching circuits 23 and 24 is coupled with common terminal C when the system detection, signal (a) is set equal to a high level (indicating receipt of image signals in the NTSC format). Conversely, input terminal A2 is coupled with common terminal C whether the signal (a) is set equal to a low level (indicating receipt of image signals in the HDTV format). Common terminals C of switching circuits 23 and 24 are respectively connected with clock terminal CLK and data terminal D of shift register 32. Shift register 32 is reset by a start pulse (not shown) which is synchronized with the horizontal synchronizing signal (b). In addition, in accordance with the first clock pulse supplied to clock terminal CLK of shift register 32, the first bit position of shift register 32 is activated so as to provide both an on-pulse (g2) and image data (t2) to the first bit position of a first section 42 in sampling and holding (S/H) circuit 40. Following this process, in response to the clock pulses supplied from switching circuit 23, shift register 32 shifts the image data (f2), bit by bit, which is supplied from switching circuit 24, and provides the on-pulse (g2) and the image data (f2) to bit positions of first section 42 corresponding to those of shift register 32. After 120 bit shifts (as contemplated by various embodiments of the present invention), shift register 32 carries-out, and directs the clock pulses from a clock output terminal and the image data from a data output terminal to respective input terminals A2 of switching circuits 21 and 22.

In addition, each of switching circuits 21 and 22 is switched over by the system detection signal (a) so that input terminal A1 of switching circuits 21 and 22 is coupled with common terminal C when the system detection signal (a) is set equal to a high level, but input terminal A2 is coupled with common terminal C when the signal (a) is set equal to a low level. Common terminals C of switching circuits 21 and 22 are respectively connected with clock terminal CLK and data terminal D of shift register 31.

Shift register 31 shifts the image data which is supplied from switching circuit 22 and provides on-pulses (g1) and image data (f1) to bit positions of a second section 41 in S/H circuit 40 corresponding to those of shift register 31, in the same manner as shift register 32, in response to the clock pulses supplied from switching circuit 21. After 720 bit shifts (as contemplated by various embodiments of the present invention), shift register 31 carries-out, and directs the clock pulses from a clock output terminal and the image data from a data output terminal to respective input terminals A2 of switching circuits 25 and 26.

As with the previous switching circuits mentioned above, each of switching circuits 25 and 26 is also switched over by the system detection signal (a) so that input terminal A1 is coupled with common terminal C when the system detection signal (a) is set equal to a high level, but input terminal A2 is coupled with common terminal C when the signal (a) is set equal to a low level. Common terminals C of switching circuits 25 and 26 are respectively connected with clock terminal CLK and data terminal D of shift register 33. Shift register 33 shifts the image data which is supplied from switching circuit 26 and provides on-pulses (g3) and image data (f3) to bit positions of third section 43 in S/H circuit 40 corresponding to those of shift register 33, in the same manner as shift register 32, in response to the clock pulses supplied from switching circuit 25. various embodiments of shift register 33 contemplate 120 bit shifts in total.

As indicated above, some embodiments of S/H circuit 40 comprise first, second and third sections 42, 41 and 43 arranged in series. In first section 42, image data (f2) supplied from shift register 32 is sampled and held at the timing of on-pulses (g2) also supplied from shift register 32. Then, the image data (f2) is supplied to data electrodes of liquid crystal panel 50 in first display area 52 which occupies the left one-eighth (⅛) of liquid crystal panel 50. In second section 41, image data (f1) supplied from shift register 31 is sampled and held at the timing of on-pulses (g1), and then the image data (f2) is supplied to data electrodes in second display area 51 which occupies the central three-fourths (¾) of liquid crystal panel 50. In the case of third section 43, image data (f3) is supplied to data electrodes in third display area 53 which occupies the right one-eighth (⅛) of liquid crystal panel 50.

Y driver 60 in FIG. 3 is activated in accordance with a timing signal generated by the video signal processing circuit (not shown) based on a vertical synchronizing signal, and sequentially energizes address lines Y1, Y2, ... respectively corresponding to scanning electrodes 501, 502, ... of liquid crystal panel 50 in synchronization with a horizontal scanning period of the HDTV system. Odd address lines Y1, Y3, ... are respectively connected with input terminals A1 of switching circuits 61, 62 ..., while even address lines Y2, Y4, ... are connected with input terminals A2 of switching circuits 61, 62, .... Each of switching circuits 61, 62, ... is switched over by the system detection signal (a) so that input terminal A1 is coupled with common terminal C when the system detection signal (a) is set equal to a high level, but input terminal A2 is coupled with common terminal C when the signal (a) is set equal to a low level. Common terminals C of these switching circuits are respectively connected with even scanning electrodes 502, 504, ...

In liquid crystal panel 50, liquid crystal elements corresponding to pixels, which are arranged in a form of matrix, are energized by a co-operation of data electrodes driven by the image data (f1), (f2) and (f3) and scanning electrodes 501, 502, .... By this process, the transparency rate of each pixel is controlled. Therefore, in the back-projection-type television receiver employing liquid crystal module 10, a colored light, such as a red (green or blue) light, is modulated into an image light by passing liquid crystal panel 50. Such an image light is projected to a screen, from the back, with the aspect ratio of 16:9.

Figure 4:
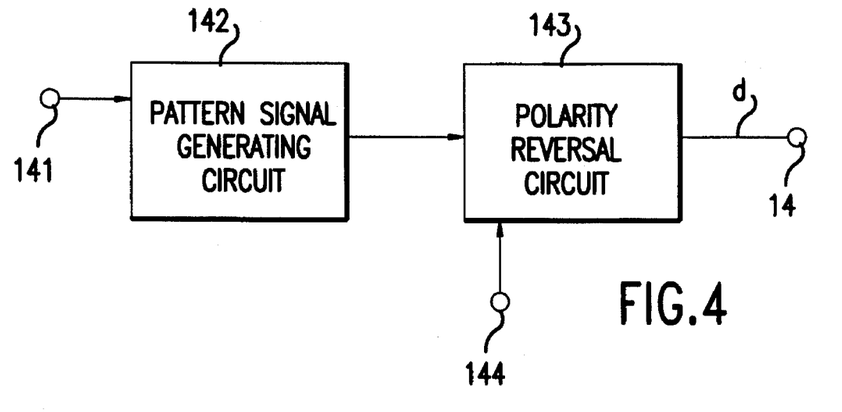
FIG. 4 is a block diagram illustrating a circuitry for providing frame image data to the circuitry of FIG. 3.

FIG. 4 is a block diagram illustrating the circuitry which produces the frame image data (d) supplied to input terminal 14 in the liquid crystal module 10 of FIG. 1. Pattern signal generating circuit 142 (which is contemplated by some embodiments of the present invention to be an IC CX7948A from Sony Corporation of Japan) selectively generates one of a plurality of image signals which provide images having different patterns in accordance with a pattern switching signal supplied from input terminal 141. The image signal generated by circuit 142 is supplied to polarity reversal circuit 143 (which some embodiments of the present invention contemplate to be an IC TA8696F from Toshiba Corporation of Japan). Polarity reversal circuit 143 provides an alternating signal as the frame image data supplied to input terminal 14. In this process, polarity reversal circuit 143 inverts a polarity of the received image signal on every other horizontal scanning period in order to prevent deterioration on liquid crystal panel 50. For this reason, polarity reversal circuit 143 is supplied with a horizontal synchronizing signal from input terminal 144.

According to the above construction, the operation of various embodiments contemplated by the present invention will now be explained with regard to FIGS. 5 and 3.

Figure 5:
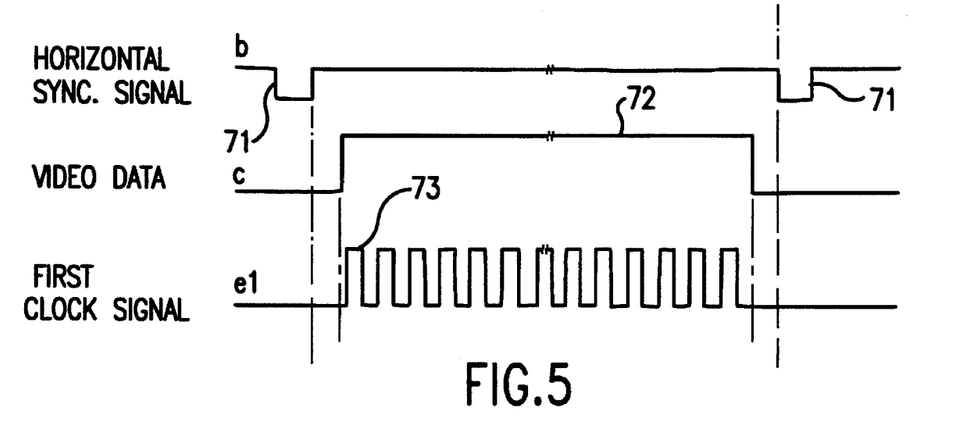
FIG. 5 is a timing chart showing signals which flow in the circuitry of FIG. 3 when displaying an image in the HDTV system format.

In the case where images in the HDTV system are displayed, the horizontal synchronizing signal (b), video data (c) and first clock signal (e1) are provided as shown in FIG. 5. In this case, since the system detection signal (a) is set equal to a low level, each of switching circuit 21 to 26 couples input terminal A2 with common terminal C. Therefore, shift registers 32, 31 and 33 are connected in series. Each of shift registers 31 to 33 is reset by the start pulse which is synchronized with each synchronizing pulse 71 of the horizontal synchronizing signal (b). With a little interval after the start pulse, the video data (c) provides an image in the HDTV system in the period of signal 72 shown in FIG. 5. During this period, shift register 32 is sequentially supplied with 960 clock pulses 73 of the first clock signal (e1). In response to each of clock pulses 73, shift register 32 shifts the video data (c) bit by bit, and provides the on-pulse (g2) and the video data (c) as the image data (f2) to first section 42 in S/H circuit 40. After 120 bit shifts, shift register 32 carries-out, and directs the clock signal (e1) and the video data (c) to shift register 31. Following this operation, shift register 31 shifts the video data (c) in accordance with the first clock signal (e1), and provides on-pulses (g1) and the video data (c) as the image data (f1) to second section 41 in S/H circuit 40. After 720 bit shifts, shift register 31 carries-out, and directs the clock signal (e1) and the video data (c) to shift register 33. Therefore, shift register 33 starts shifting the video data (c) in accordance with the first clock signal (e1), and provides on-pulses (g3) and the video data (c) as the image data (f3) to third section 43 in S/H circuit 40. After 120 bit shifts, shift register 33 carries-out.

By this process, S/H circuit 40 holds image data of one horizontal scanning period, and introduces new image data for each horizontal scanning period. At the same time, since the system detection signal (a) causes each of switching circuits 61, 62, ... to couple input terminal A2 with common terminal C, address lines Y1, Y2, ... are respectively connected with scanning electrodes 501, 502, ... of liquid crystal panel 50. Y driver 60 sequentially drives address lines Y1, Y2, ... in synchronization with a horizontal scanning period in the HDTV system. This, scanning electrodes 501, 502, ... are sequentially energized, so that liquid crystal elements in liquid crystal panel 50 are driven based on image data supplied through the data electrodes. As a result, the transparency of each pixel in liquid crystal panel 50 is controlled so as to project an image light onto a screen.

Figure 6:
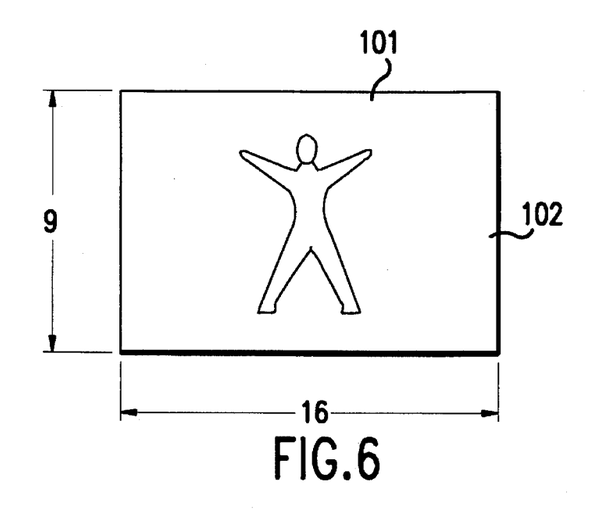
FIG. 6 is an illustration of a display screen showing an image in the HDTV system format which is displayed on a screen with the aspect ratio of 16:9 based on the signals in FIG. 5.

The back-projection-type television receiver to which this embodiment is applied has a screen with the aspect ratio of 16:9. Therefore, by the above operation, as shown in FIG. 6, image 101 with the aspect ratio of 16:9 in the HDTV system is displayed on the whole of screen 101.

Figure 7:
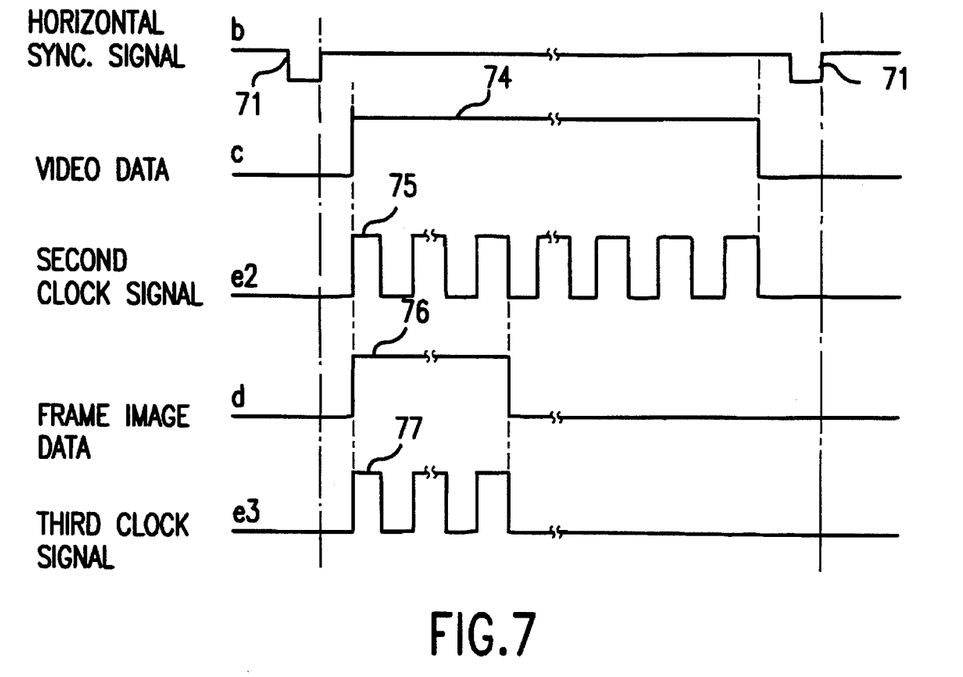
FIG. 7 is a timing chart showing signals which flow in the circuitry of FIG. 3 when displaying an image in the NTSC system format.

FIG. 7 is a timing chart showing the horizontal synchronizing signal (b), video data (c), second clock signal (e2), frame image data (d) and third clock signal (e3) in the case where images in the NTSC system format are displayed. In this case, since the system detection signal (a) is set equal to a high level, each of switching circuits 21 to 26 couples input terminal A1 with common terminal C. Therefore, shift registers 31 to 33 are separately activated. Each of shift registers 31 to 33 is reset by the start pulse which is synchronized with synchronizing pulse 71 of the horizontal synchronizing signal (b). With a little interval after the start pulse, the video data (c) provides an image in the NTSC system in the period of signal 74 shown in FIG. 6. During this period, shift register 31 is sequentially supplied with 720 clock pulses 75 of the second clock signal (e2). However, at the same time as the video data (c), the frame image data (d) provides an image in the period of signal 76 which is the first one-eighth (⅛) of the period of signal 74, and each of shift registers 32 and 33 is sequentially supplied with 120 clock pulses 77 of the third clock signal (e3) during this period.

In response to each of clock pulses 75 and 77, shift register 31 shifts the video data (c) by the bit, while both 1.4 shift registers 32 and 33 shift the frame image data (d) bit by bit. Shift register 31 provides the on-pulse (g1) and the video data (c) as the image data (f1) to second section 41 in S/H circuit 40, and carries-out after 720 bit shifts. However, shift registers 32 and 33 respectively provide the on-pulses (g2) and (g3) and the frame image data (d) as the image data (f2) and (f3) to first and third sections 42 and 43 in S/H circuit 40, and carry-out after 120 bit shifts.

By this process, S/H circuit 40 holds image data including both the video data (c) in the NTSC system format and the frame image data (d) in one horizontal scanning period, and introduces new image data for each horizontal scanning period.

At the same time, since the system detection signal (a) causes each of switching circuits 61, 62, . . . to couple input terminal A1 with common terminal C, odd address lines Y1, Y3, . . . of Y driver 60 are respectively connected with not only odd scanning electrodes 501, 503, . . . but also even scanning electrodes 502, 504, . . . of liquid crystal panel 50. Y driver 60 sequentially drives address lines Y1, Y2, . . . in synchronization with a horizontal scanning period in the HDTV system. Therefore, odd scanning electrodes 501, 503, . . . are sequentially energized in synchronization with a horizontal scanning period in the NTSC system (that is twice as long as that in the HDTV system), while even scanning electrodes 502, 504, . . . are sequentially energized at the same time as respective odd scanning electrodes 501, 503, . . . and therefore the scanning mode is altered in accordance with the television system format being received.

Thus, the liquid crystal elements in first, second and third display areas 52, 51 and 53 of liquid crystal panel 50 are respectively driven based on the frame image data (d), the video data (c) in the NTSC system and the frame image data (d) each supplied through the data electrodes. As a result, the transparency of each pixel in liquid crystal panel 50 is controlled so as to project an image light onto a screen.

Figure 8:
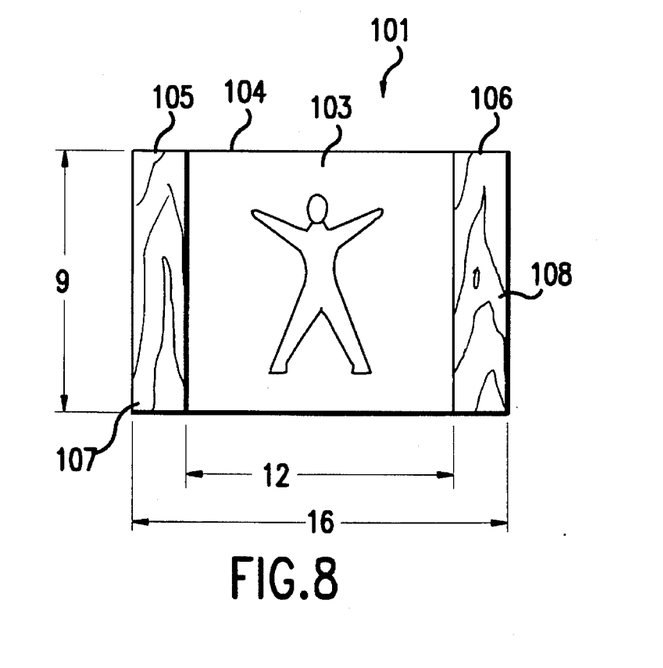
FIG. 8 is an illustration of a display screen showing an image in the NTSC system format which is displayed on a screen with the aspect ratio of 16:9 based on the signals in FIG. 7.

In this case, as shown in FIG. 8, image 103 with the aspect ratio of 4:3 in the NTSC system is displayed on a central section 104 which occupies three-fourths (¾) of the horizontal length of screen 101 having an aspect ratio of 16:9. In the remaining left and right sections 105 and 106 in screen 101, images 107 and 108 having patterns of the grain of wood are respectively displayed since the image signal providing such image is selected at pattern signal generating circuit 142 in FIG. 4.

In accordance with this embodiment, liquid crystal module 10 is capable of working with image signals in both the HDTV and NTSC system formats for displaying images. In addition, many of the circuits in liquid crystal module 10 are used in common for displaying either image in the HDTV and NTSC system format, so that liquid crystal module 10 is suitable for commercialization. Moreover, since the frame image data can be freely set into an image signal providing a desired pattern, preferable viewing can be provided even when an image with the aspect ratio different from that of the screen is displayed.

In the above embodiment, the apparatus for driving a liquid crystal display device is applied to a back-projection-type television receiver. However, an apparatus provided by the present invention can be applied to any type of display apparatus using a liquid crystal display device, such as an ordinary liquid crystal television receiver and a front-projection-type television receiver, as well. In addition, an apparatus provided by the present invention can be used for driving a liquid crystal display device with any aspect ratio besides 16:9, as well. For instance, in the case where a liquid crystal display device having an aspect ratio of 4:3 displays an image received in the HDTV system format (as shown in FIG. 1), the means for switching over the video data and the frame data at the specified vertical timing (from that used by NTSC) would be apparent to one skilled in the art. It should also be understood, though, that the present invention can be applied to television system formats other than NTSC and HDTV, including formats established by the Society of Motion Picture and Television Engineers (SMPTE).

It should further be understood that embodiments of the present invention contemplate the use of various memories which can be used in lieu of the shift registers mentioned above. Such memories include random access memory (RAM), any type of erasable read-only memory (EPROM), charge coupled device (CCD), optical memory devices, and any other type of data retention device.

In addition, it should be emphasized that the various components of embodiments of the present invention can be implemented in hardware, software or a combination thereof. In such embodiments, the various components and steps would be implemented in hardware and/or software to perform the functions of the present invention. Any presently available or future developed computer software language and/or hardware components can be employed in such embodiments of the present invention.

While the present invention has been illustrated and described in detail in the drawings and foregoing description, it will be recognized that changes and modifications can and will occur to those skilled in the art. It is therefore intended by the appending claims, to cover any such modifications as fall within the true spirit and scope of the invention.

What is claimed is:

1. An apparatus for controlling a liquid crystal display device, wherein the apparatus receives an image signal in one of at least two possible television system formats for displaying an image, each format having an aspect ratio, and displays the image signal on the liquid crystal display device, the apparatus comprising:

format switching means for receiving a format signal indicative of the television system format of the image signal being received, and for adjusting the apparatus to receive the image signal in accordance with the indicative television system format;

data accumulating means for receiving the image signal from said format switching means for directing the signal to the liquid crystal display device;

said data accumulating means comprising a plurality of data forwarding means wherein one or more data forwarding mean receives, in accordance with the aspect ratio of the television system format being received, a selected portion of the image signal to be directed to the liquid crystal display device; and image generating mean for supplying said data accumulating means frame image data, wherein said frame image data is directed to selected portions of said liquid crystal display device.

2. The apparatus of claim 1, further comprising scanning means for scanning the liquid crystal display device while said data accumulating means directs the image signal to said liquid crystal display device.

3. The apparatus of claim 2, wherein said scanning means controls a scanning mode and alters said scanning mode in accordance with the television system format being received.

4. The apparatus of claim 1, wherein said data forwarding means comprise shift register means having a plurality of bit positions for sequentially shifting said image signal.

5. The apparatus of claim 4, further comprising sampling and holding means for sampling and holding said image signal supplied from each of said plurality of bit positions of said shift register means and for providing said image signal to the liquid crystal display device.

6. A display apparatus for receiving an image signal in one of at least two possible television system formats, each format having an aspect ratio, and for displaying an image based upon the image signal, comprising:

format switching means for receiving a format signal indicative of the television system format of the image signal being received, and for adjusting the apparatus to receive the image signal in accordance with the indicated television system format;

visual display means for displaying the image;

data accumulating means for receiving the image signal from said format switching mean and for directing the signal to said visual display means;

said data accumulating means comprising one or more data forwarding means for receiving, in accordance with the aspect ratio of the television system format being received, a selected portion of the image signal to be directed to said visual display means; and image generating means for supplying said data accumulating means with frame image data, wherein said frame image data is directed to selected portion of said liquid crystal display device.

7. The apparatus of claim 6, wherein said visual display means comprises liquid crystal elements, data electrodes and scanning electrodes.

8. The apparatus of claim 6, further comprising scanning means for scanning said visual display means while said data accumulating means directs the image signal to said visual display means.

9. The apparatus of claim 8 wherein said scanning means controls a scanning mode and alters said scanning mode in accordance with the television system format being received.

10. A television receiver, comprising:

reception means for receiving an image signal in one of at least two possible television system formats, each format having an aspect ratio;

format switching mean for receiving a format signal indicative of the television system format of the image signal being received by said reception means, and for adjusting the receiver to receive the image signal in accordance with the indicated television system format;

visual display means for displaying the image; and data accumulating means for receiving the image signal from said format switching means for directing the signal to said visual display means;

said data accumulating means comprising a plurality of data forwarding means wherein one or more data forwarding means receives, in accordance with the aspect ratio of the television system format being received, a selected portion of the image signal to be directed to said visual display means; and image generating means for supplying said data accumulating means with frame image data, wherein said frame image data is directed to selected portions of said liquid display device.

11. The apparatus of claim 10, wherein said data forwarding means comprise shift register means having a plurality of bit positions for sequentially shifting said image signal.

12. The apparatus of claim 11, further comprising sampling and holding means for sampling and holding said image signal supplied from each of said plurality of bit positions of said shift register means and for providing said image signal to the visual display means.

13. A method for controlling a liquid crystal display, wherein an image signal in one of at least two possible television system formats for displaying an image is received, each image having an aspect ratio, the method comprising the steps of:

(a) receiving a format signal indicative of the television system format of the image signal being received;

(b) adjust one or more switches to receive the image signal in accordance with the indicated television system format;

(c) receiving the image signal and directing the image signal to the liquid crystal display using a plurality of data forwarding means, wherein one or more data forwarding means receives, in accordance with the aspect ratio of the television system format being received, a selected portion of the image signal to be directed to the liquid crystal display, and (d) image generating means for supplying said data accumulating means with frame image data, wherein said frame image data is directed to selected portions of said liquid crystal display device.

14. The method of claim 13, further comprising the step of scanning the liquid crystal display while said step (c) directs the image signal to the liquid crystal display.

15. An apparatus for controlling a liquid crystal display device, wherein the apparatus receives an image signal in one of at least a first and second possible television system formats for displaying an image, each format having an aspect ratio, and displays the image signal on the liquid crystal display device, the apparatus comprising:

format switching means for receiving a format signal indicative of the television system format of the image signal being received, and for adjusting the apparatus to receive the image signal in accordance with the indicated television system format;

data accumulating means for receiving the image signal from said format switching means and for directing the signal to the liquid crystal display device;

said data accumulating means comprising at least two data forwarding means, wherein all of said at least two data forwarding means receive a selected portion of the image signal when said image signal is in the first television system format and wherein at least one but not all of said at least two data forwarding means receive a selected portion of the image signal when said image signal is in the second television system format, wherein the image signal in said at least two data forwarding means is directed to the liquid crystal display device; and image generating means for supplying each of said data forwarding means not receiving said image signal frame image data when said image signal is in the second television system format, wherein said frame image data is directed to selected portions of said liquid crystal display device.

16. The apparatus of claim 15 wherein said at least two data forwarding means comprises three data forwarding means, wherein each of said three data forwarding means receives said image signal where said image signal is in the second television system format, and wherein two of said three data forwarding means receives frame image data when said image signal is in the second television system format.

* * * * *

UNITED STATES PATENT AND TRADEMARK OFFICE
CERTIFICATE OF CORRECTION

PATENT NO. : 5,534,940
DATED : July 9, 1996
INVENTOR(S) : Masayori Sato, et al

It is certified that error appears in the above-indentified patent and that said Letters Patent is hereby corrected as shown below:

On the title page, item [73] Assignee:

"Kabushiki Kaisha Japan, Japan" should be --Kabushiki Kaisha Toshiba, Japan--.

Signed and Sealed this

Fifth Day of November, 1996

*Attest:*

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,534,940
DATED : July 9, 1996
INVENTOR(S) : Masayori Sato and Kouichi Tago It is certified that error appears in the above-indentified patent and that said Letters Patent is hereby corrected as shown below:

Column 8, line 47, insert --with-- after means;
Column 9, line 45, insert --and-- after means; and
Column 10, line 7, change "adjust" to --adjusting--.

Signed and Sealed this

Tenth Day of December, 1996

Attest:

BRUCE LEHMAN

*Attesting Officer*  *Commissioner of Patents and Trademarks*